United States Patent Office 3,532,655
Patented Oct. 6, 1970

3,532,655
FINISHING VARNISH FOR DECORATED
METAL SHEET
Sol B. Radlove, Chicago, and Abraham Ravve, Lincolnwood, Ill., assignors to Continental Can Company, Inc., New York, N.Y., a corporation of New York
No Drawing. Filed Dec. 22, 1967, Ser. No. 692,669
Int. Cl. C08g 37/36; C08f 45/28
U.S. Cl. 260—28.5      8 Claims

ABSTRACT OF THE DISCLOSURE

A finishing varnish for decorated metal surfaces is prepared from a mixture of an acrylic resin, a heat-reactive aminoplast resin, and a polyethylene resin having a specific gravity greater than 9.90 and a molecular weight of 1500 to 4000.

BACKGROUND OF INVENTION

Field of invention

This invention relates to a varnish and more particularly to an improved finishing varnish for decorated metal sheets.

The prior art

In the manufacture of can bodies, sheets of metal plate are first properly prepared with respect to the surfaces thereof before the sheets are fabricated into can bodies. For example, on the surface of such a sheet that is going to form the exterior surfaces of the can body is decorated and printed by lithography or other appropriate technique. To protect the printed can body, the printed surface is coated with a thin coating of a finishing varnish. The finishing varnish provides the necessary protective coating to prevent abrasion in the subsequent stamping and forming operations carried out on the coated metal sheet and facilitates movement of the can body during the manufacturing process.

The finishing varnish may be applied directly over the undried ink, after which the coated metal is baked at an elevated temperature to cure the varnish as well as the underlying ink.

Vinyl and alkyd amine resins are often used in the art as finishing varnishes. One serious limitation with these and other prior art finishing resins, from a commercial standpoint, is that the resins are seriously degraded by temperatures higher than 400° to 500° F. Temperatures in this range or above cannot be employed to effect a quick curing of the varnish systems, but rather, lower temperatures, and therefore, longer curing times are employed. It is extremely important that, for large volume applications, the finishing varnish systems be composed of resins which are stable to high temperatures so that rapid curing can be effected.

Further, in many commercial applications where customer acceptance depends upon colorful surfaces, it is necessary that the can surface have a clear and glossy appearance. This is particularly true for applications such as food container exterior coatings, household articles, appliances, structural modules, and the like.

It is known to the art that acrylic resin-based coatings have good heat stability and may be readily cured at high temperatures, i.e., in the range of 400° to 500° F. These materials have not found wide application as finishing varnishes because the coatings have poor self-lubricating properties. The addition of internal or external lubricants usually interfered with gloss and overall appearance of the decorated surface.

SUMMARY OF THE INVENTION

In accordance with the present invention, there is provided a finishing varnish which may be cured at temperatures in excess of 400° F. in very short times which has excellent self-lubricating properties and cures to a very high gloss surface, the varnish being comprised of a mixture of an acrylic resin, a heat-reactive aminoplast resin, and a low molecular weight polyethylene wax.

PREFERRED EMBODIMENTS

The acrylic resin used to prepare the finishing varnish of the present invention is a copolymer polymerized from a mixture of monomers comprising about 5 to about 95 parts of at least one polymerizable vinyl benzene monomer and about 95 to about 5 parts of at least one ester of of an alpha-olefinic monocarboxylic acid having the general formula:

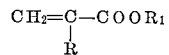

wherein R is either hydrogen or a lower alkyl group of from 1 to 4 carbon atoms, and $R_1$ represents an alkyl, hydroxy alkyl or cycloalkyl group of from 1 to 18 carbon atoms.

The polymerizable vinyl benzene monomers which are used in the preparation of the copolymer include styrene, methyl-substituted vinyl benzenes, such as alpha-methyl styrene, and ring-substituted methyl vinyl, vinyl benzenes, such as vinyl toluene.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2-ethyl hexyl acrylate, cyclohexyl acrylate, decyl acrylate, stearly acrylate, methyl methacrylate, methyl alpha-ethyl acrylate, ethyl methacrylate, butyl methacrylate, butyl alpha-ethyl acrylate, hydroxy propyl acrylate and lauryl methacrylate.

Broadly described, the preparation of the copolymer is to mix one or more of the above monomer components in a volatile, inert, organic solvent, and then to add a catalytic amount of a peroxide type catalyst. The resultant mixture is then heated at a temperature of approximately 110° to 120° C. for 1 to 3 hours in an inert atmosphere of, e.g., nitrogen. Various peroxide type catalysts are employable. The benzoyl peroxide is illustrative of peroxides and per compounds which are known to effect polymerization of ethylenically unsaturated compounds. Other organic peroxides which are usable for effecting condensation or polymerization of vinyl compounds include cumene hydroperoxide, tertiary butyl peroxide, tertiary butyl terbenzoate and methyl ethyl ketone peroxide. Azo-bisisobutyronitrile is also useful.

The polyethylene resin useful in the practice of the present invention is a low molecular weight resin having a molecular weight from about 1500 to 4000 and a specific gravity greater than 0.90 and preferably in the range of 0.91 to 0.93. The polyethylene is added to the varnish as a dispersion in an organic solvent.

The finishing varnish is prepared by mixing the copolymer reaction product with a compatible organic solution of the polyethylene resin and then blending the mixture with a heat reactive aminoplast resin. The aminoplast resins useful in the practice of the invention are those formed by the condensation of urea, melamine or combinations thereof with formaldehyde. These resins are known to the art and include, for example, urea/formaldehyde, melamine/formaldehyde, and urea/melamine/formaldehyde resins.

In the final finishing varnish, the copolymer resin comprises about 95 to about 5 percent by weight of the non-volatile constituents of the varnish, the polyethylene resin comprises about 0.5 to about 15 percent by weight of the non-volatile constituents of the varnish, and the aminoplast resin comprises about 5 to about 40 percent by weight of the non-volatile constituents of the varnish.

To accelerate the rate of cure of the varnish, a suitable catalyst may be added to the varnish. Examples of suitable varnish curing catalysts include acid catalysts, such as maleic acid, fumaric acid, p-toluene sulfonic acid and the like. The acid catalysts are preferably blocked with an amine, such as 3-methoxy n-propyl amine, morpholine, or triethyl amine to prevent polymerization at room temperature.

In preparing the varnish compositions of the present invention, the copolymer resin, the aminoplast resin, and the catalyst are dissolved in volatile oragnic solvents, such as xylene, high flash naphtha, and the like. Alcohols such as hexanol, 2-ethyl hexanol are added to the varnish system for improved compatibility of the varnish components. The polyethylene resin is added to the varnish system as a dispersion in an organic solvent such as xylene, naphtha, and the like.

The finishing varnish compositions of this invention can be satisfactorily applied at a solids content ranging from about 25 to about 50 percent by weight, based on the total weight of the liquid varnish composition. Generally, a solids content of 35 to 42 percent by weight is preferred.

The finishing varnish compositions can be satisfactorily applied by any of the conventional methods employed by the coating industry. However, for coating of decorated sheet metal used in container fabrication, roller coating is a preferred method, as the desired coating weight is easily and conveniently applied in a single coat. Spraying, dipping and flow coating are also useful methods of applying the finishing varnish.

After applying the varnish, the varnish is cured by heating the coated substrate at a temperature of about 420° to about 450° F. At these temperatures, the varnish will be cured to a hard coating in about 1 to about 3 minutes.

To provide the decorated coated metal sheet substrates with an adequately protective and self-lubricating coating, dry film weight of the varnish should be in the range of 2 to 5 milligrams of dry coating per square inch of decorated surface.

To illustrate the manner in which the invention may be carried out, the following examples are given. It is to be understood that the examples are for the purpose of illustration and the invention is not to be regarded as limited to any of the specific compounds or conditions recited therein.

EXAMPLE (A) Preparation of acrylic copolymer resin component

To a 5 liter, 3 necked flask fitted with a stirrer, thermometer, nitrogen inlet and outlet, condenser and dropping funnel, was placed 285 grams of high flash naphtha and 285 grams of 2-ethyl hexyl alcohol. The solvent mixture under $N_2$ was heated to 115° C. and the following materials added:

Monomer charge: Grams
Styrene _____ 900
2-ethyl hexyl acrylate _____ 180
Hydroxy propyl methacrylate _____ 270
Lauryl methacrylate _____ 180
Methyl methacrylate _____ 270
Benzoyl peroxide (catalyst) _____ 72

The monomer components were slowly added over a 1.5 hour period, with stirring, under a nitrogen atmosphere. The reaction temperature was maintained at 115° C. After the addition of the monomer, the mixture was further stirred and heated an additional 1.5 hour period with the addition of an additional 3 grams of benzoyl peroxide each 0.5 hour.

After the reaction was completed, a solution of 17 grams of 3-methoxy n-propyl amine in 150 milligrams of Panasol AN-1, a high boiling aromatic solvent, (B.P. 200–270° F.) available from the Amoco Chemical Company, was added at 100° C. The percentage solids of this solution was 63.1%.

(B) Preparation of the polyethylene component

Twenty grams of AC-6 polyethylene [1] were added to 90 grams high flash naphtha and the mixture was then raised to a temperature of 90° to 100° C. to effect solution of the polyethylene. After solution of the polyethylene, the solution cooled to 69° C. and an additional 90 grams of high flash naphtha was added to the solution. The cooled fluid dispersion contained 10% solids.

(C) Preparation of the finishing varnish

A finishing varnish formulation was prepared using the following components:

Varnish component

Acrylic resin solution (A)—1462 grams
Melamine/formaldehyde resin (as 60% solid solution)— 390 grams
Catalyst [1]—1.38 grams
D.C. 200 [2]—0.20 grams
2-ethyl hexyl alcohol—100 ml.
Panasol AN-1—800 ml.

[1] Prepared by mixing 17.2 grams (0.1 mole) p-toluene sulfonic acid with 9.0 grams (0.1 mole) 3-methoxy-n-propyl amine.
[2] D.C. 200 is a polymethyl silicone having a viscosity of 200 cps. available from Dow Corning Corporation.

To 546.4 grams of the above finishing varnish was added 70 grams of polyethylene component prepared in B above.

The finishing varnish formulation prepared above was diluted with Panasol AN-1 to a percent solids of 30 and a viscosity of 25 seconds at 77° F., and was applied on metal cans having a wet lithographic print over a white acrylic resin base coat. The finishing varnish was cured at 440° F. for 2 minutes. Inspection of the decorated cans indicated that varnish produced a hard gloss smooth surface. The varnish combined with and formed a coherent system with the lithographic ink. Generally, using conventional alkyd amine-based finishing varnishes at equivalent curing periods, the underlying ink is soft. The film was tested for removal with cellophane tape and fingernail and was found to be extremely resistant to both.

The self-lubricating properties of the varnish were tested by a laboratory body wall lubricity test wherein the angle at which a can set at the top of an inclined plane will start to slide down the plane, is used to ascertain the lubricity or lack of friction (referred to as mobility) of the coating. The lower the angle at which the can starts to slide down the plane, the better the lubricity of the coating. An angle of 30° or below is considered commercially acceptable.

The can to which the above finishing varnish had been applied had a mobility of 25°.

By way of contrast, a finishing varnish prepared in a manner similar to the above varnish of Example I with the exception that a polyethylene resin having a specific gravity of 0.88 and a molecular weight of 3500 was substituted for the polyethylene resin in the example when cured to a dry film had a dull, seedy surface in contrast to the high gloss surface produced by the varnish of the example.

By way of further contrast, when microcrystalline waxes or Fisher-Tropsch waxes were substituted for the polyethylene resin in the example, the resultant finishing varnish, when cured to a dry film, had a dull or cratered surface.

[1] AC-6 is a product of the Allied Chemical Corporation and has a molecular weight of 2,000 and the following physical properties:
Melting point, ° F. _____ 219 to 226
Hardness, ASTM D-1321, 100 g., 5 seconds, 77° F. _____ 3 to 5
Viscosity at 140° C., centistokes/sec. _____ 180
Specific gravity _____ 0.92

What is claimed is:

1. A finishing varnish for application to decorated metal surface comprising:
(1) About 5 to about 95% by weight of a copolymer consisting of about 5 to about 95 parts by weight of at least one polymerizable vinyl benzene and about 5 to about 95 parts by weight of at least one ester of an alpha-olefinic monocarboxylic acid having the general formula:

$$CH_2=\underset{R}{C}-COOR_1$$

wherein R is selected from the group consisting of hydrogen and a lower alkyl group of from 1 to 4 carbon atoms, and $R_1$ is selected from the group consisting of alkyl, hydroxy alkyl, and cycloalkyl groups having 1 to 18 carbon atoms: (2) about 5 to 40% by weight of a heat reactive amine-aldehyde condensate resin and (3) about 0.5 to about 15% by weight of a polyethylene resin having a specific gravity greater than 0.90 and a molecular weight between 1500 and 4000.

2. The finishing resin of claim 1 wherein the vinyl benzene is styrene.

3. The finishing resin of claim 1 wherein the ester is 2-ethyl hexyl acrylate.

4. The finishing resin of claim 1 wherein the ester is hydroxy propyl methacrylate.

5. The finishing resin of claim 1 wherein the ester is lauryl methacrylate.

6. The finishing resin of claim 1 wherein the ester is methyl methacrylate.

7. The finishing resin of claim 1 wherein the aminoplast resin is a melamine/formaldehyde resin.

8. The finishing resin of claim 1 wherein the polyethylene resin has a molecular weight of about 2000 and a specific gravity of about 0.92.

References Cited

UNITED STATES PATENTS

| 2,655,489 | 10/1953 | Lawson | 260—854 |
| 3,011,993 | 12/1961 | Kapalko et al. | 260—854 |
| 3,234,158 | 2/1966 | Pfluger et al. | |
| 3,350,329 | 10/1967 | Scholl. | |
| 3,429,842 | 2/1969 | Wolstuncroft. | |
| 3,442,837 | 5/1969 | Brotz et al. | 260—28.5 |

JOHN C. BLEUTGE, Primary Examiner

U.S. Cl. X.R.

117—132, 161; 260—28, 29.1, 33.4, 33.6, 854, 855